(12) United States Patent
Yosef et al.

(10) Patent No.: US 11,249,885 B2
(45) Date of Patent: Feb. 15, 2022

(54) TEST CASE GENERATOR AND USER INTERFACE

(71) Applicant: EMC IP Holding Company LLC, Hopkinton, MA (US)

(72) Inventors: Ilan Yosef, Petach Tikva (IL); Bella Bekker Vernik, Herzliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/786,396

(22) Filed: Feb. 10, 2020

(65) Prior Publication Data
US 2021/0248057 A1   Aug. 12, 2021

(51) Int. Cl.
*G06F 9/44* (2018.01)
*G06F 11/36* (2006.01)
*G06F 3/0482* (2013.01)

(52) U.S. Cl.
CPC ........ *G06F 11/3684* (2013.01); *G06F 3/0482* (2013.01); *G06F 11/3664* (2013.01); *G06F 11/3688* (2013.01)

(58) Field of Classification Search
CPC ............. G06F 11/3684; G06F 11/3688; G06F 11/3664; G06F 3/0482
See application file for complete search history.

(56) References Cited

U.S. PATENT DOCUMENTS

| | | | | |
|---|---|---|---|---|
| 8,276,123 | B1* | 9/2012 | Deng | G06F 11/368 717/125 |
| 9,514,034 | B1* | 12/2016 | Griffin | G06F 11/3672 |
| 2005/0005198 | A1* | 1/2005 | Vakrat | G06F 11/2294 714/37 |
| 2007/0016829 | A1* | 1/2007 | Subramanian | G06F 11/3684 714/38.1 |
| 2008/0010542 | A1* | 1/2008 | Yamamoto | G06F 11/3672 714/38.1 |
| 2008/0127095 | A1* | 5/2008 | Brennan | G06F 11/3664 717/124 |
| 2013/0042222 | A1* | 2/2013 | Maddela | G06F 11/3684 717/124 |

* cited by examiner

*Primary Examiner* — Wei Y Zhen
*Assistant Examiner* — Amir Soltanzadeh
(74) *Attorney, Agent, or Firm* — Daly, Crowley, Mofford & Durkee, LLP

(57) ABSTRACT

An aspect includes displaying a list of test case functions via a user interface. Each of the test case functions includes a corresponding set of instructions that is extracted from a development application, and each of the test case functions is configured to execute an atomic action with respect to a test case. The set of instructions is transparent to a user of the user interface. An aspect further includes receiving, via the user interface, a user-inputted selection of the test case functions from the list. For each test function of the selected test case functions, an aspect includes displaying, via the user interface, a field for receiving a device identifier for a device subject to the test case; receiving, via the user interface, a user-inputted device identifier; assembling the test case from the selected test case functions and the device identifier; and executing the test case for the device.

17 Claims, 7 Drawing Sheets

300A

```
@TSFDecorator
def TSF_ValidateShowVolFoldersFormat(cluster):
    """This TSF validate the show-vol-folders table
    format :param cluster: cluster object
    :type cluster: trident.cluster.Cluster
    :returns: None
    """
    line1 = ['Name', 'Index', 'Parent-Folder-
Name', 'Index', 'Num-of-Vols', 'Vol-Size']
    line2 = ['/','1',str(len(cluster.volumes))]
    showVolFolders = cluster.ShowVolFolders().stdout CheckTableFields(line1, showVolFolders[0].split(), 'show-
volume-folders', reportObj)
    CheckTableFields(line1, showVolFolders[1].split()[0:-1],
'show-volume-folders', reportObj, line2)
```

308 — 310

304 — TEST FUNCTION ID
TEST FUNCTION ID
···
TEST FUNCTION ID

302

306

307 — SELECT FUNCTION   DONE — 309

FIG. 3A

```
@TSFDecorator
def TSF_GetAndPreparesSDForInsert(brick=None, ssd=None,
fixneed=1, keyName=None):
    """Function get ssd from user or randomized from
    brick and prepared it to insert :param brick: brick object
        :type brick: trident.brick.Brick
        :param ssd: ssd object
        :type ssd: trident.ssd.Ssd
        :param keyName: name of key in TS_VARS
        dictionarty to save ssd in
        :type keyName: None or string
        :returns: None
        :raises trident.xioexceptions.TestFailure: if
        preparation process fail or if ejection of ssd failed
        """

ssd = GetAndPreparesSDForInsert(brick,ssd,fixneed)
    testInit.SetVar(keyName, ssd)
```

FIG. 3B

TEST CASE GENERATOR AND USER INTERFACE

BACKGROUND

In computer systems and network environments, there are typically code developers that are experienced in developing code to enable the computer systems to perform specified tasks, as well as to enable these systems to interoperate efficiently with other computer systems. In these environments, there are also test engineers (e.g., quality assurance engineers) who are tasked with designing tests for ensuring that these systems and devices operate according to minimum standards.

It is common for these test engineers to have much less knowledge and/or experience in coding than their code development peers. Without this knowledge and experience, creating and implementing testing such on system devices and components can be challenging for the test engineers.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect provides a method for test case generation. The method includes displaying a list of test case functions via a user interface. Each of the test case functions includes a corresponding set of instructions that is extracted from a development application, and each of the test case functions is configured to execute an atomic action with respect to a test case. The set of instructions is transparent to a user of the user interface. The method further includes receiving, via the user interface, a user-inputted selection of the test case functions from the list. For each test function of the selected test case functions, the method includes displaying, via the user interface, a field for receiving a device identifier for a device subject to the test case; receiving, via the user interface, a user-inputted device identifier, assembling the test case from the selected test case functions and the device identifier; and executing the test case for the device.

Another aspect provides a system for test case generation. The system includes a memory comprising computer-executable instructions, and a processor operable by a storage system. The processor is operable for executing the computer-executable instructions. The computer-executable instructions when executed by the processor cause the processor to perform operations. The operations include displaying a list of test case functions via a user interface. Each of the test case functions includes a corresponding set of instructions that is extracted from a development application, and each of the test case functions is configured to execute an atomic action with respect to a test case. The set of instructions is transparent to a user of the user interface. The operations further include receiving, via the user interface, a user-inputted selection of the test case functions from the list. For each test function of the selected test case functions, the operations further include displaying, via the user interface, a field for receiving a device identifier for a device subject to the test case; receiving, via the user interface, a user-inputted device identifier assembling the test case from the selected test case functions and the device identifier; and executing the test case for the device.

A further aspect provides a computer program product for test case generation. The computer program product is embodied on a non-transitory computer readable medium. The computer program product includes instructions that, when executed by a computer, causes the computer to perform operations. The operations include displaying a list of test case functions via a user interface. Each of the test case functions includes a corresponding set of instructions that is extracted from a development application, and each of the test case functions is configured to execute an atomic action with respect to a test case. The set of instructions is transparent to a user of the user interface. The operations further include receiving, via the user interface, a user-inputted selection of the test case functions from the list. For each test function of the selected test case functions, the operations further include displaying, via the user interface, a field for receiving a device identifier for a device subject to the test case; receiving, via the user interface, a user-inputted device identifier; assembling the test case from the selected test case functions and the device identifier, and executing the test case for the device.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIGS. 3A-3C illustrate sample user interface screens for generating and implementing test cases according to an embodiment;

DETAILED DESCRIPTION

Embodiments described herein provide a technique for enabling test engineers to generate and execute test cases for computer devices, components, and systems without requiring detailed knowledge of the underlying software code that drives the testing. The embodiments include a repository of test functions that can be manipulated by a test engineer, where each of the test functions is configured to render a pre-defined atomic action in facilitating a system test. Upon selecting, by the test engineer, a particular group of test functions from the repository, as well as system device/component information (such as identifiers of components subject to a test), a corresponding set of software test code associated with the selected functions is assembled, transparently to the engineer, and is then implemented for the identified devices.

The test case functionality is extensible to accommodate additions/changes to types of testing as well as devices and components subject to the testing. Exemplary test case processes in conjunction with a user interface described herein facilitate the functionality of existing coding tools that are devoid of a web API or similar interface. By way of non-limiting example, and for purposes of illustration, the test functions and code examples described herein are provided for use in conjunction Python, a programming language for application developers.

Figure 1:
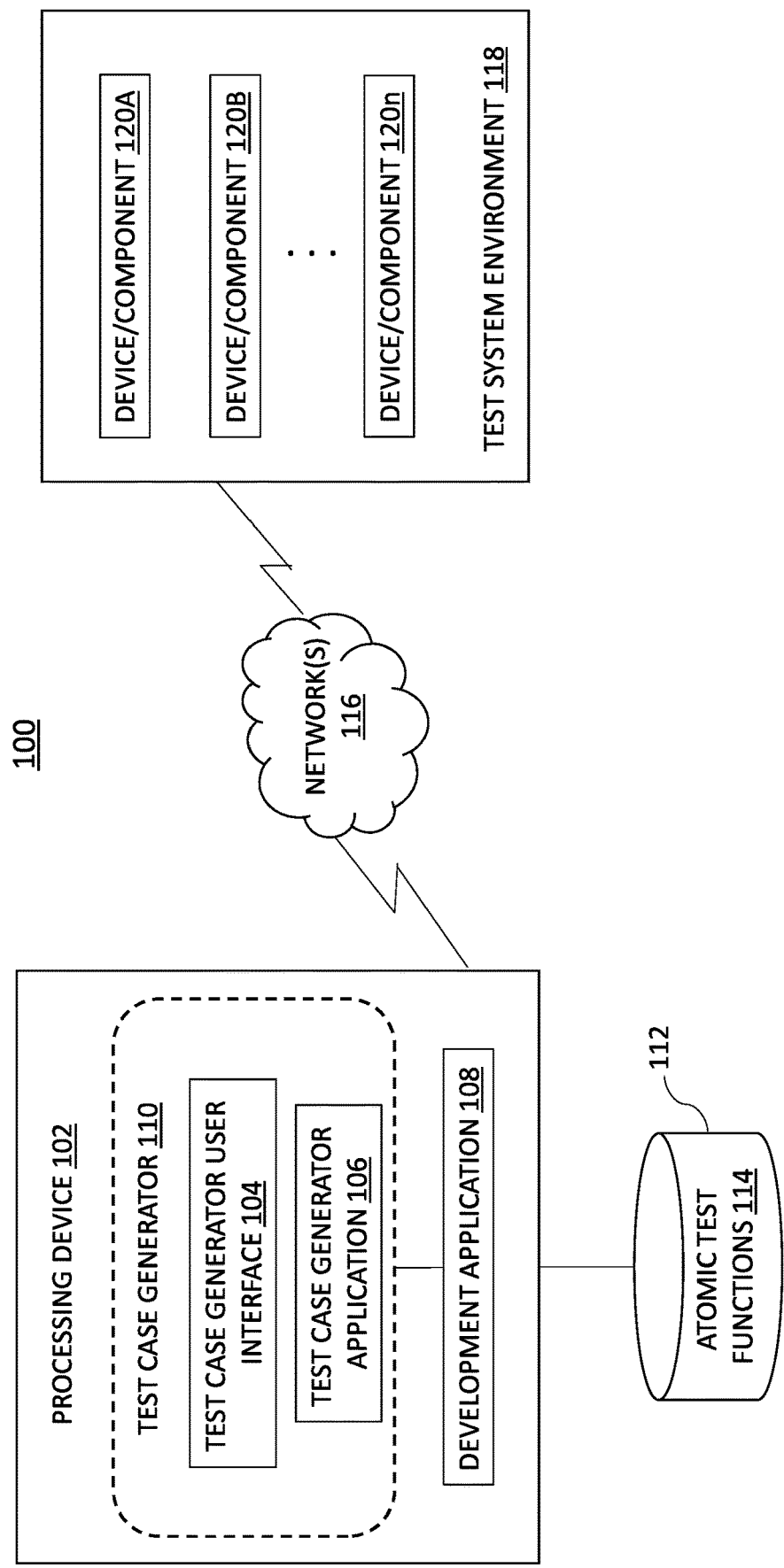
FIG. 1 depicts a block diagram of a system for implementing test case processes in an application development environment according to an embodiment.

Turning now to FIG. 1, a system 100 for implementing the test case processes will now be described in embodiments. The system 100 includes a processing device 102 that is communicatively coupled to a test system environment 118 via one or more networks 116.

The processing device 102 includes a processor (not shown) coupled to a memory 112. In an embodiment, the processor may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements. Also included in the processing device 102 is network interface circuitry (not shown), which is used to interface the processing device with the networks 116 and other system components and may comprise conventional transceivers.

In embodiments, the processing device 102 may be a server or other type of computer of an enterprise computer system, cloud-based computer system, or other arrangement of multiple compute nodes associated with respective users.

The term "user" herein is intended to be broadly construed to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

In an embodiment, the processing device 102 executes one or more applications, including a test case generator user interface 104, a test case generator application 106 (collectively referred to herein as "test case generator" 110). The test case generator application 106 is implemented to enable the creation of test functions for systems, devices, and components of an environment, such as test system environment 118. These functions are atomic in nature, such that each function corresponds to a single and independent action in the test environment, as will be described further herein. These functions are organized within the test case generator user interface 104 and provided for access by test engineers, such as quality assurance (QA) engineers to enable the creation of test cases without requiring the engineers to have detailed knowledge of the underlying software code. To this end, the test case generator application 106 enables the creation of software blocks corresponding to a development application 108 or other programming tool, such as Python, where each of the blocks is configured to execute a specific action in furtherance of a component test. A library 114 of these atomic test functions may be stored in a repository, e.g., in memory 112.

The memory 112 may comprise random access memory (RAM), read-only memory (ROM), flash memory or other types of memory, in any combination. The memory 112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

In embodiments, the networks 116 form part of a global computer network such as the Internet, although other types of networks can be part of the networks 116, including a wide area network (WAN), a local area network (LAN), a satellite network, a telephone or cable network, a cellular network, a wireless network such as a WiFi or WiMAX network, or various portions or combinations of these and other types of networks. The networks 116 in some embodiments therefore includes combinations of multiple different types of networks each including processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in the embodiments, as will be appreciated by those skilled in the art.

Again, the particular system 100 shown in the Figure is presented by way of example only, and the system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the test case functionality of one or more components of a system as disclosed herein are illustratively implemented in the form of software running on one or more processing devices.

The system environment 118 includes devices and components 120A-120n (collectively 120) subject to testing. The environment is described herein with respect to a storage system environment in which storage elements are subject to the testing. However, it will be understood that the test case generation is not limited to testing storage elements but rather any system components in a computer or network environment.

The devices 120A-120n in the system 100 of FIG. 1 may be storage devices and components, e.g., solid state drives (SSDs). Such SSDs are implemented using non-volatile memory (NVM) devices such as flash memory. Other types of NVM devices that can be used to implement at least a portion of the storage devices 120 include non-volatile random access memory (NVRAM), phase-change RAM PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers.

For example, the fast tier may comprise flash drives or other types of SSDs while the capacity tier comprises HDDs. The particular storage devices used in a given storage tier may be varied in other embodiments, and multiple distinct storage device types may be used within a single storage tier.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Figure 2:
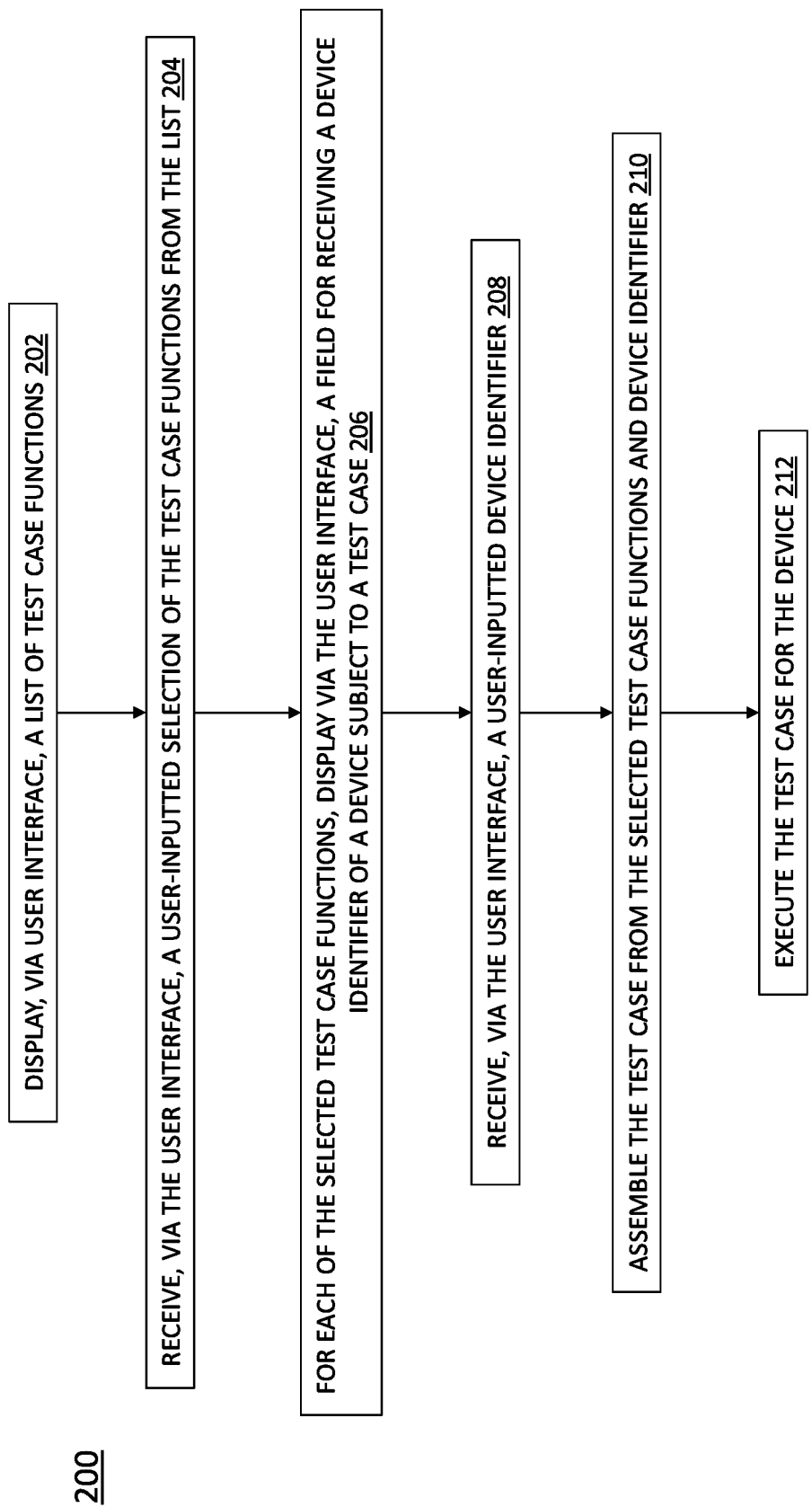
FIG. 2 is a flow diagram of a process for generating test cases using an interface and building blocks from a development tool according to an embodiment.
Figure 3C:
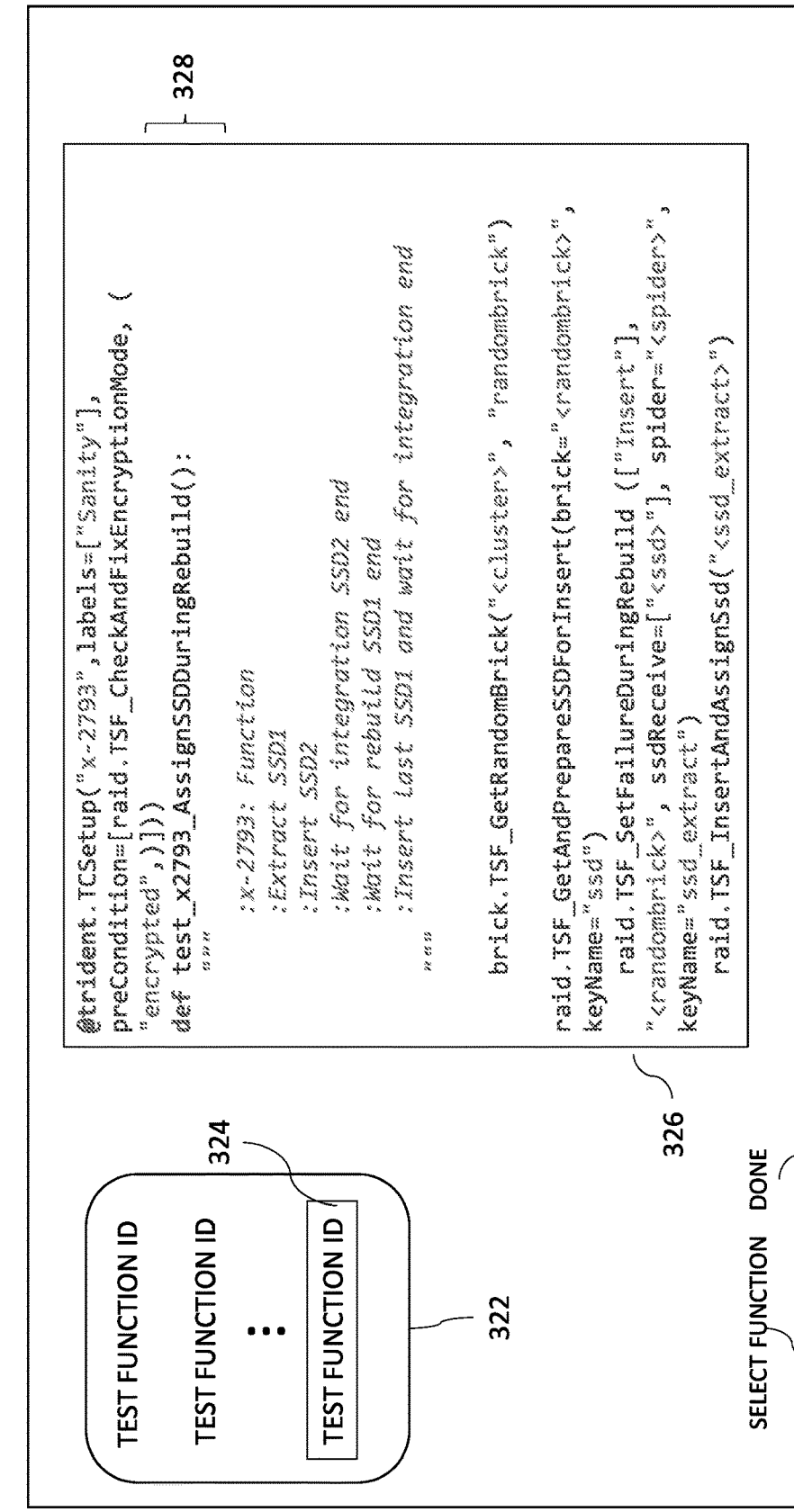
Figure 4:
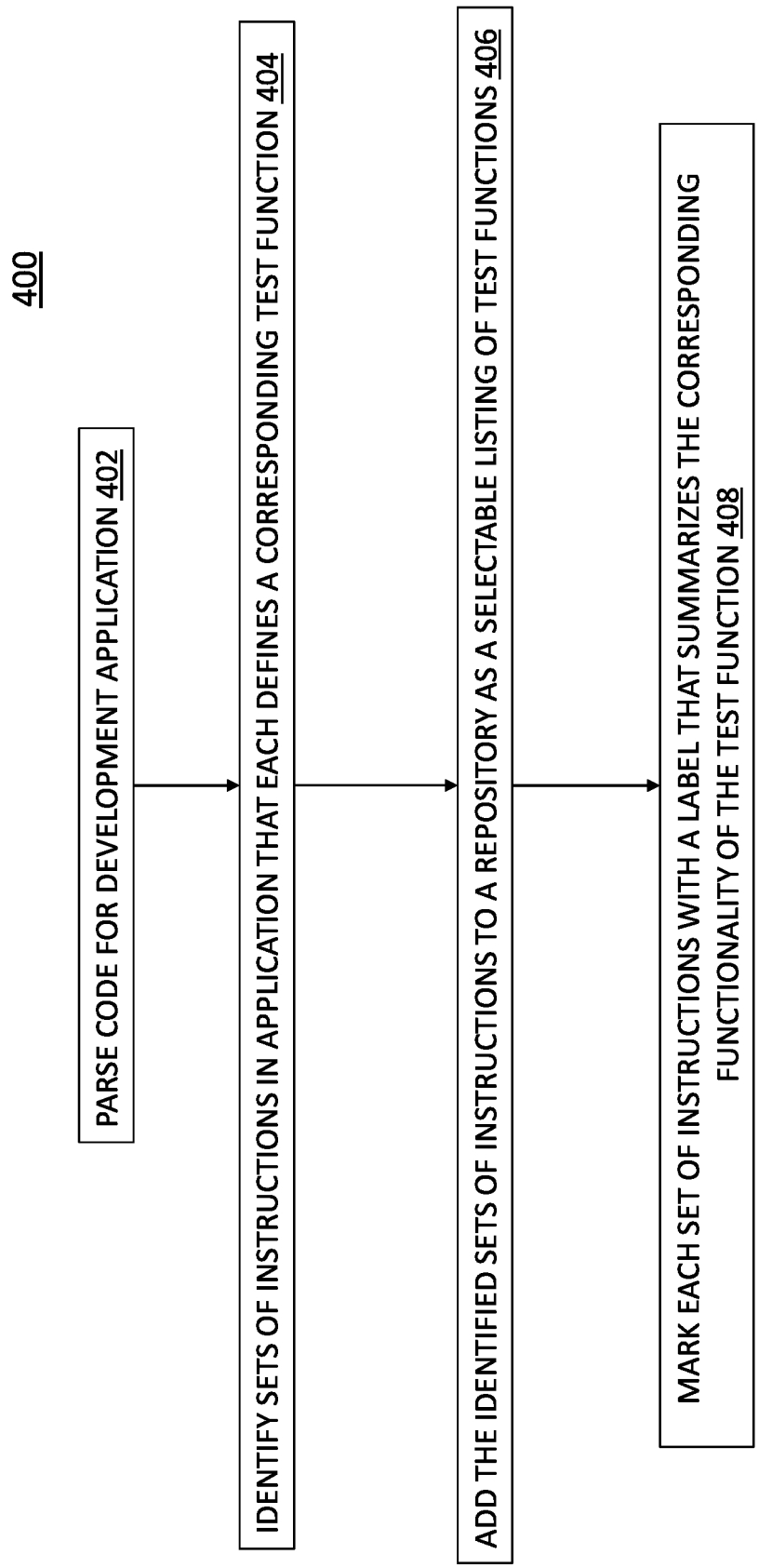
FIG. 4 is a flow diagram of a process for generating building blocks for a test case generator user interface using the user interface and building blocks from FIG. 2 according to an embodiment.

The test case generator 110 logic in some embodiments is configured to build test case functions for a development application and provide a user interface for generating test cases, as illustrated in the flow diagrams of FIGS. 2 and 4, as well as a user interface shown in FIGS. 3A-3C.

The system 100 in the FIG. 1 embodiment is assumed to be implemented using at least one processing platform each comprising one or more processing devices each having a processor coupled to a memory. Such processing devices can illustratively include particular arrangements of compute, storage and network resources. The system 100 may be implemented on a distinct processing platform, although numerous other arrangements are possible. At least portions of its associated host devices may be implemented on the same processing platforms as the system 100 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for various elements/nodes to reside in different data centers. Numerous other distributed implementations of the system 100 and its respective processing devices are possible.

An additional example of a processing platform utilized to implement the system in illustrative embodiments will be described in more detail below in conjunction with FIG. 4.

It is to be appreciated that these and other features of illustrative embodiments are presented by way of example only and should not be construed as limiting in any way.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the system 100 will now be described in further detail with reference to the flow diagrams of the illustrative embodiments of FIGS. 2 and 4, as well as FIGS. 3A-3C, which implement a test case process and user interface.

Turning now to FIGS. 2 and 3A-3C, a process 200 and user interface for generating a test case through a series of test functions created from a development tool will now be described in accordance with an embodiment. The process 200 of FIG. 2 generally describes a technique for generating a test case for components/devices of a storage system environment. However, the embodiments are not limited to testing of storage elements but rather may apply to any system or network devices. The process 200 of FIG. 2 further assumes that a user, such as a test engineer, has accessed the user interface in preparation for generating the test case.

In block 202, the user interface displays a list of test case functions. As shown in a user interface screen 300A of FIG. 3A, for example, a listing (or menu) 302 of available test case functions associated with the development tool is presented to the user. Each of the test case functions is mapped to a corresponding set of instructions extracted from the development application. In addition, each of the test case functions is configured to execute a unique atomic action with respect to a test case. An atomic action may refer to a particular and singular function that can be carried out independently of other functions. The set of instructions for each of the test case functions is transparent to the user of the user interface. Thus, a user of the user interface, who is not an experienced code developer, would not be required to be well-versed in the underlying development code in order to identify and select desired test functions in creating a test case.

In block 204, the process 200 receives, via the user interface screen 300A, a user-inputted selection of the test case functions from the list. As shown, e.g., in FIG. 3A, the user selects a test case function 304. The illustrative test case function 304, upon selection, causes the process 200 to display a corresponding window 306 via the user interface. The window 306 displays a descriptive label followed by a brief definition of the selected test case function (shown at 308). Using the Python application as an example of the development code used by the process 200, the test case function is wrapped in a TSF decorator (@TSFDecorator).

In block 206, for each test function of the selected test case functions, the process 200 displays, via the user interface screen 300A, a field for receiving various parameters for the test case, such as a device identifier and other profile information for the device subject to the test case. Sample input fields are shown generally at 310 (e.g., the user may supply the system (cluster) object name).

In block 208, the process 200 receives, via the user interface 300A, user-inputted parameters, such as the device identifier. Once this has completed, the user may click "SELECT FUNCTION" 307 to begin a new test case function or "DONE" 309 to complete the test case. Alternatively, the user can simply select a new test case function from the menu 302 to begin a new test case function.

As indicated above, it will be understood that multiple test case functions can be selected by the user in order to create the test case. In FIGS. 3B-3C, two additional sample test case functions are selected by the user via user interface screens 300B-300C. As shown, e.g., in a user interface screen 300B of FIG. 3B, the user has selected a different test case function 314 from menu 312 which prompts the process 200 to display another window 316. Similar to the window 306 of FIG. 3A, the window 316 shows the test case function wrapped in a TSF Decorator and a descriptive label and definition of the function is shown at 318. As shown in FIG. 3B, the test case function is configured to retrieve and prepare a solid state disk (SSD) for insert to the system. Similar to the test case function described above in FIG. 3A, the user in FIG. 3B is prompted to provide profile information via the window 316 with respect to the test case function.

A user interface screen 300C of FIG. 3C illustrates yet another example of a test case function 324 selected by the user via menu 322. The process 200, in turn, displays a window 326 that corresponds to the selected test case function 324, which provides a descriptive label and definition of the test case function 324 at 328. In this screen 300C, the test case function provides for assignment of an SSD during rebuild, however, it also contains a precondition, which is described further herein. As shown in FIG. 3C, the window 326 contains prompts for the user to enter profile information for the test case function.

If additional test case functions are desired, the user may select "SELECT FUNCTION" 327. Once the user has completed the selection of the test case functions and profile information, the user selects "DONE" 329 and the process 200 assembles the test case from the information inputted by the user in block 210.

In block 212, the process 200 utilizes the instructions sets defined for the test case functions to execute the test case for the specified devices/components.

In addition to building a test case from the test case functions, additional functionality is enabled via the user interface and processes described herein. For example, the user interface may display reporting options (not shown) configured to report results of execution of the test case, such as a pass/fail designation, a number of successful cycles, and a total number of cycles implemented for the test case. The user may configure the test case reporting options via the user interface.

In addition to the reporting options, the user interface may be configured to enable a user to select from a list of preconditions, each of which define an event the occurrence of which is configured to preempt the test case from execution. For example, a precondition is shown in user interface screen 300C. The precondition selected by the user defines the event as a mode of a particular encryption state. If the event has occurred (i.e., the encryption mode is set to 'unencrypted'), the test case will not execute until the mode has been fixed to a desired state, which is listed as 'encrypted.' The precondition causes the process 200 to check this precondition prior to executing the test case function on the specified device/component, which here is assign SSD during rebuild. Thus, the process 200 receives, as input via the user interface, a selected one of preconditions, validates the event defined for the selected one of the preconditions, and upon determining the selected precondition has been met, preempting execution of the test case, or in this instance, the test case function.

The user interface may be further configured to provide additional functionality to the test case functions. For example, a set of functions may be defined for implementation after a test case has been completed. For example, after completion of a test case, a test case function is configured for validating that a particular device subject to the test case was successfully released from that test case and is available and in condition for future testing.

Other functionality that may be configured via the user interface includes, for example, options to provide color coded views of selected test cases (e.g., a user can choose to have different reports of test case results to be displayed and/or printed in different colors), select a number of iterations to execute a designated one of the test cases, and display a user-inputted text string with results of the test cases.

As indicated above, the test case functions are defined to perform unique atomic actions with respect to functions of a test case. Turning now to FIG. 4, a process 400 for generating these test functions and creating components of the user interface will now be described in accordance with an embodiment.

In block 402, the process 400 parses code for the development application. In block 404, from the parsed code, the process 400 identifies sets of instructions that each defines a corresponding test function in which each of the test functions is configured to perform an atomic action independent of other functions. In block 406, the process 400 adds the identified sets of instructions to a repository as the above-described test functions. The repository, e.g., may be stored in the memory 112 of FIG. 1.

In block 408, the process 400 marks each of the identified sets of instructions with a label that summarizes the corresponding test function. The label may include a name of the test function and/or a definition (e.g., as shown in the user interface screens 30A-300C above).

The particular processing operations and other system functionality described in conjunction with the flow diagrams of FIGS. 2 and 4 are presented by way of illustrative example only and should not be construed as limiting the scope of the disclosure in any way. Alternative embodiments can use other types of processing operations to provide test case processes. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagrams of FIGS. 2 and 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In some implementations of the FIG. 2 and FIG. 4 processes, the system comprises content addressable storage systems configured to maintain various components that are utilized in the test case processes. In addition, the content addressable storage system is configured to maintain metadata structures, e.g., the logical layer and physical layer mapping tables described below. It is to be appreciated that these particular tables are only examples, and other tables or metadata structures having different configurations of entries and fields can be used in other embodiments.

An address-to-hash ("A2H") utilized in some embodiments comprises a plurality of entries accessible utilizing logical addresses as respective keys, with each such entry of the A2H table comprising a corresponding one of the logical addresses, a corresponding hash handle, and possibly one or more additional fields.

A hash-to-data ("H2D") table utilized in some embodiments comprises a plurality of entries accessible utilizing hash handles as respective keys, with each such entry of the H2D table comprising a corresponding one of the hash handles, a physical offset of a corresponding one of the data pages, and possibly one or more additional fields.

A hash metadata ("HMD") table utilized in some embodiments comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table may also include one or more additional fields.

A physical layer based ("PLB") table utilized in some embodiments illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements described above can be varied in other embodiments. For example, additional or alternative arrangements of entries can be used.

As indicated above, in some embodiments, the storage system may comprise an XtremIO storage array or other type of content addressable storage system suitably modified to incorporate functionality for test case processes as disclosed herein.

An illustrative embodiment of such a content addressable storage system will now be described with reference to FIG. 5. In this embodiment, a content addressable storage system 505 comprises a plurality of storage devices 506 and an associated storage controller 510. The content addressable storage system 505 may be viewed as a particular implementation of the system 100 of FIG. 1.

The storage controller 510 in the present embodiment is configured to implement functionality for efficient test case processes of the type previously described in conjunction with FIGS. 1 through 4.

The storage controller 510 includes distributed modules 512 and 514, (collectively referred to as test case generator 519) which are configured to operate in a manner similar to that described above for respective corresponding test case generator 110 of the system 100 of FIG. 1. Module 512 is more particularly referred to as distributed test case generator user interface 512, which corresponds to the test case generator user interface 104 of FIG. 1, and illustratively comprises multiple instances on respective ones of a plurality of distinct nodes. Module 514 is more particularly referred to as a distributed test case generator application 514, which corresponds to the test case generator application 106 of FIG. 1, and illustratively comprises multiple test case generator application instances on respective ones of the distinct nodes. In addition, the storage controller 510 also includes a development application 517, which corresponds to the development application 108 of FIG. 1.

Figure 5:
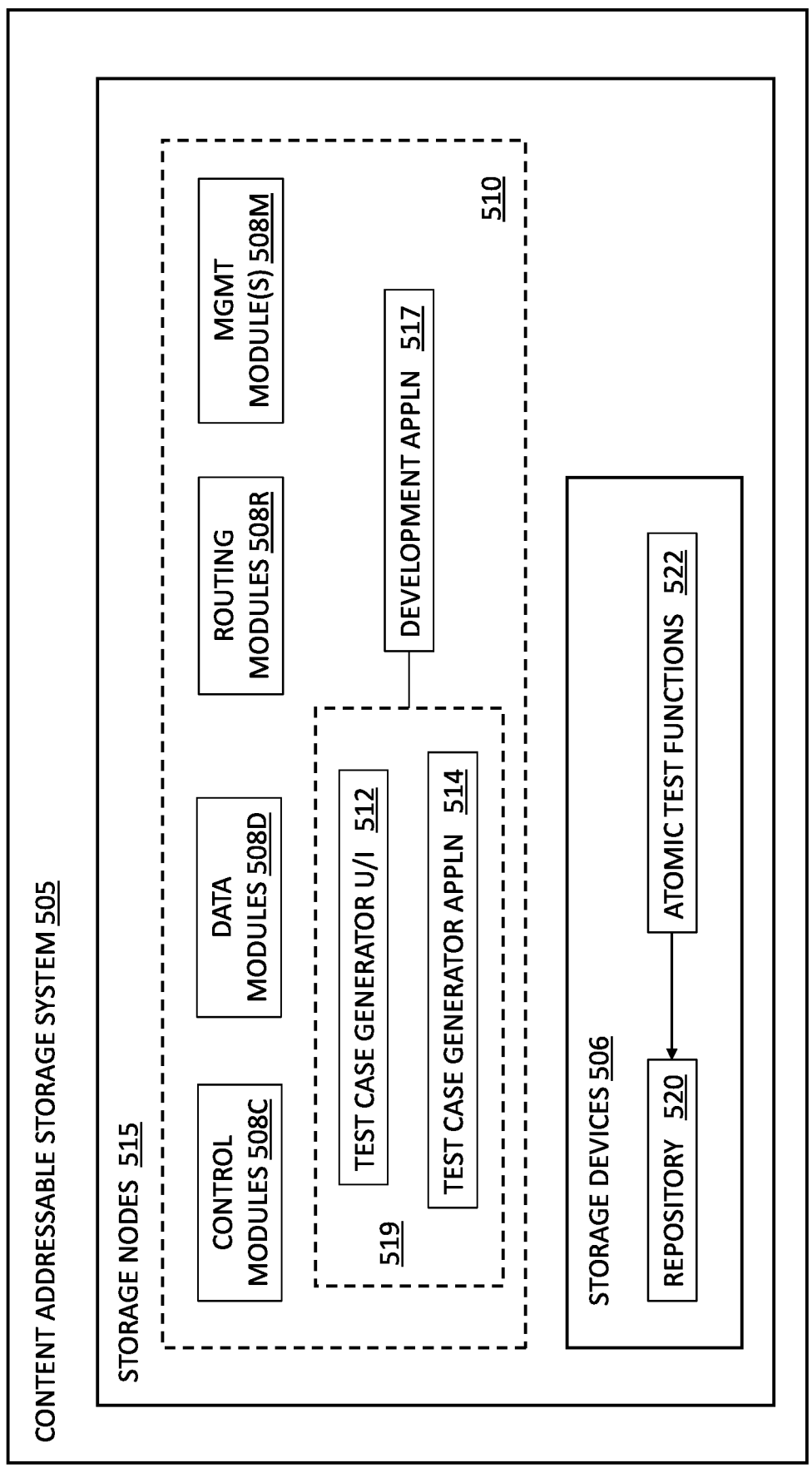
FIG. 5 depicts an alternative system for implementing test case processes in accordance with an embodiment.

The content addressable storage system 505 in the FIG. 5 embodiment is implemented as at least a portion of a clustered storage system and includes a plurality of storage nodes 515 each comprising a corresponding subset of the storage devices 506. Such storage nodes 515 are examples of the "distinct nodes" referred to above, and other clustered storage system arrangements comprising multiple storage nodes and possibly additional or alternative nodes can be used in other embodiments. A given clustered storage system may therefore include not only storage nodes 515 but also additional storage nodes, compute nodes or other types of nodes coupled to networks 116.

The storage controller 510 of the content addressable storage system 505 is implemented in a distributed manner to comprise a plurality of distributed storage controller components implemented on respective ones of the storage nodes 515. The storage controller 510 is therefore an example of what is more generally referred to herein as a "distributed storage controller." In subsequent description herein, the storage controller 510 is referred to as distributed storage controller 510.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 510 of the content addressable storage system 505.

The modules of the distributed storage controller 510 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 510 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 510 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as separate modules of the distributed storage controller 510, the modules 512 and 514 and, optionally, the development application 517, in the present embodiment are assumed to be distributed at least in part over at least a subset of the other modules 508C, 508D, 508R and 508M of the storage controller 510. Accordingly, at least portions of the test case functionality of the modules 512 and 514 may be implemented in one or more of the other modules of the storage controller 510. In other embodiments, the modules 512 and 514 may be implemented as stand-alone modules of the storage controller 510.

The storage devices 506 are configured to store a repository 520, which in turn stores atomic test functions 522, and may also store additional information not explicitly shown. The atomic test functions 522 correspond to the atomic test functions in library 114 of FIG. 1.

The test case functionality provided by modules 512 and 514 in this embodiment is assumed to be distributed across multiple distributed processing modules, including at least a subset of the processing modules 508C, 508D, 508R and 508M of the distributed storage controller 510.

For example, the management module 508M of the storage controller 510 may include a test case logic instance that engages corresponding test case logic instances in all of the control modules 508C and routing modules 508R in order to implement a test case generation process. As indicated above, in some embodiments, the content addressable storage system 505 comprises an XtremIO storage array suitably modified to incorporate test case functionality as disclosed herein.

In arrangements of this type, the control modules 508C, data modules 508D and routing modules 508R of the distributed storage controller 510 illustratively comprise respective C-modules, D-modules and R-modules of the XtremIO storage array. The one or more management modules 508M of the distributed storage controller 510 in such arrangements illustratively comprise a system-wide management module ("SYM module") of the XtremIO storage array, although other types and arrangements of system-wide management modules can be used in other embodiments. Accordingly, test case functionality in some embodiments is implemented under the control of at least one system-wide management module of the distributed storage controller 510, utilizing the C-modules, D-modules and R-modules of the XtremIO storage array.

Write requests processed in the content addressable storage system 505 each illustratively comprise one or more IO operations directing that at least one data item of the storage system 505 be written to in a particular manner. A given write request is illustratively received in the storage system 505 from a host device over a network. In some embodiments, a write request is received in the distributed storage controller 510 of the storage system 505 and directed from one processing module to another processing module of the distributed storage controller 510. For example, a received write request may be directed from a routing module 508R of the distributed storage controller 510 to a particular control module 508C of the distributed storage controller 510. Other arrangements for receiving and processing write requests from one or more host devices can be used.

As indicated above, the term "write request" as used herein is intended to be broadly construed, so as to encompass one or more IO operations directing that at least one data item of a storage system be written to in a particular manner. A given write request is illustratively received in a storage system from a host device.

In the XtremIO context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

The content addressable storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 505. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping. The second level of mapping using the HMD table associates respective ones of the content-based signatures with respective physical storage locations in one or more storage devices. This is also referred to as physical layer mapping.

Examples of these and other metadata structures utilized in illustrative embodiments were described above in conjunction with FIG. 2. These particular examples include respective A2H, H2D, HMD and PLB tables. In some embodiments, the A2H and H2D tables are utilized primarily by the control modules 508C, while the HMD and PLB tables are utilized primarily by the data modules 508D.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement test case functionality in a clustered storage system in other embodiments.

Additional examples of content addressable storage functionality implemented in some embodiments by control modules 508C, data modules 508D, routing modules 508R and management module(s) 508M of distributed storage controller 510 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    displaying a list of test case functions via a user interface, each of the test case functions comprising a corresponding set of instructions that is extracted from a development application and each of the test case functions is configured to execute a unique atomic action with respect to a test case, wherein the extraction comprises:
        parsing code for the development application;
        identifying sets of instructions that each defines a corresponding one of the test functions;
        adding the identified sets of instructions to a repository as the test functions; and
        marking each of the identified sets of instructions with a label that summarizes the corresponding test function;
    receiving, via the user interface, a user-inputted selection of the test case functions from the list;
    for each test function of the selected test case functions, displaying, via the user interface, a field for receiving one or more parameters for the test case function;
    receiving, via input at the user interface, a user-inputted one or more parameters for the test case function;
    assembling the test case from the selected test case functions and the user-inputted one or more parameters; and
    executing the test case for a device.

2. The method of claim 1, further comprising:
    displaying, via the user interface, reporting options configured to report results of execution of the test case, wherein reportable results include a pass/fail designation, a number of successful cycles, and a total number of cycles implemented; and
    receiving, as input via the user interface, a selected one of the reporting options.

3. The method of claim 1, further comprising:
    displaying, via the user interface, a list of preconditions, each of the preconditions defining an event the occurrence of which is configured to preempt the test case from execution;
    receiving, as input via the user interface, a selected one of preconditions;
    validating the event defined for the selected one of the preconditions;
    upon determining the selected precondition has been met, preempting execution of the test case.

4. The method of claim 1, further comprising:
    displaying, via the user interface, a list of functions configured for implementation upon completion of execution of the test case;
    receiving, as input via the user interface, a selected one of the functions and a device identifier corresponding to the selected one of the functions; and
    executing the selected one of the functions after completion of the test case.

5. The method of claim 4, wherein the selected one of the functions is configured to validate that the device subject to the selected one of the functions has been released from a prior test case and is available for test.

6. The method of claim 1, further comprising displaying, via the user interface, options configured to implement at least one of:
    color coded views of selected test cases;
    a number of iterations to execute a designated one of the test cases; and
    display of a user-inputted text string with results of the test cases.

7. A system comprising:
    a user interface;
    a memory comprising computer-executable instructions for implementing the user interface; and
    a processor operable by a storage system, the processor executing the computer-executable instructions, the computer-executable instructions when executed by the processor cause the processor to perform operations comprising:
        displaying a list of test case functions via the user interface, each of the test case functions comprising a corresponding set of instructions that is extracted from a development application and each of the test case functions is configured to execute a unique atomic action with respect to a test case, where the extraction comprises:
            parsing code for the development application;
            identifying sets of instructions that each defines a corresponding one of the test functions;
            adding the identified sets of instructions to a repository as the test functions; and
            marking each of the identified sets of instruction with a label that summarizes the corresponding test function;
        receiving, via the user interface, a user-inputted selection of the test case functions from the list;
        for each test function of the selected test case functions, displaying, via the user interface, a field for receiving one or more parameters for the test case function;
        receiving, via input at the user interface, a user-inputted one or more parameters for the test case function;
        assembling the test case from the selected test case functions and the user-inputted one or more parameters; and
        executing the test case for a device.

8. The system of claim 7, wherein the operations further comprise:
    displaying, via the user interface, reporting options configured to report results of execution of the test case, wherein reportable results include a pass/fail designation, a number of successful cycles, and a total number of cycles implemented; and
    receiving, as input via the user interface, a selected one of the reporting options.

9. The system of claim 7, wherein the operations further comprise:
    displaying, via the user interface, a list of preconditions, each of the preconditions defining an event the occurrence of which is configured to preempt the test case from execution;

receiving, as input via the user interface, a selected one of preconditions;
validating the event defined for the selected one of the preconditions;
upon determining the selected precondition has been met, preempting execution of the test case.

10. The system of claim 7, wherein the operations further comprise:
displaying, via the user interface, a list of functions configured for implementation upon completion of execution of the test case;
receiving, as input via the user interface, a selected one of the functions and a device identifier corresponding to the selected one of the functions; and
executing the selected one of the functions after completion of the test case.

11. The system of claim 10, wherein the selected one of the functions is configured to validate that the device subject to the selected one of the functions has been released from a prior test case and is available for test.

12. The system of claim 7, wherein the operations further comprise displaying, via the user interface, options configured to implement at least one of:
color coded views of selected test cases;
a number of iterations to execute a designated one of the test cases; and
display of a user-inputted text string with results of the test cases.

13. A computer program product embodied on a non-transitory computer readable medium, the computer program product including instructions that, when executed by a computer, causes the computer to perform operations comprising:
displaying a list of test case functions via a user interface, each of the test case functions comprising a corresponding set of instructions that is extracted from a development application and each of the test case functions is configured to execute a unique atomic action with respect to a test case, wherein the extraction comprises:
parsing code for the development application;
identifying sets of instructions that each defines a corresponding one of the test functions;
adding the identified sets of instructions to a repository as the test functions; and
marking each of the identified sets of instructions with a label that summarizes the corresponding test function;
receiving, via the user interface, a user-inputted selection of the test case functions from the list;
for each test function of the selected test case functions, displaying, via the user interface, a field for receiving one or more parameters for the test case function;
receiving, via input at the user interface, a user-inputted one or more parameters for the test case function;
assembling the test case from the selected test case functions and the user-inputted one or more parameters; and
executing the test case for a device.

14. The computer program product of claim 13, wherein the operations further comprise:
displaying, via the user interface, reporting options configured to report results of execution of the test case, wherein reportable results include a pass/fail designation, a number of successful cycles, and a total number of cycles implemented; and
receiving, as input via the user interface, a selected one of the reporting options.

15. The computer program product of claim 13, wherein the operations further comprise:
displaying, via the user interface, a list of preconditions, each of the preconditions defining an event the occurrence of which is configured to preempt the test case from execution;
receiving, as input via the user interface, a selected one of preconditions;
validating the event defined for the selected one of the preconditions;
upon determining the selected precondition has been met, preempting execution of the test case.

16. The computer program product of claim 13, wherein the operations further comprise:
displaying, via the user interface, a list of functions configured for implementation upon completion of execution of the test case;
receiving, as input via the user interface, a selected one of the functions and a device identifier corresponding to the selected one of the functions; and
executing the selected one of the functions after completion of the test case;
wherein the selected one of the functions is configured to validate that the device subject to the selected one of the functions has been released from a prior test case and is available for test.

17. The computer program product of claim 13, wherein the operations further comprise displaying, via the user interface, options configured to implement at least one of:
color coded views of selected test cases;
a number of iterations to execute a designated one of the test cases; and
display of a user-inputted text string with results of the test cases.

* * * * *